O. A. SAWYER.

Loom-Pickers.

No. 145,905.

Patented Dec. 23, 1873.

UNITED STATES PATENT OFFICE.

ORREN A. SAWYER, OF LOWELL, MASSACHUSETTS.

IMPROVEMENT IN LOOM-PICKERS.

Specification forming part of Letters Patent No. 145,905, dated December 23, 1873; application filed October 3, 1873.

*To all whom it may concern:*

Be it known that I, ORREN A. SAWYER, of Lowell, in the county of Middlesex and State of Massachusetts, have invented certain new and useful Improvements in Iron Collars for Pickers for Looms; and I do hereby declare the following to be a full, clear, and exact description of the invention, such as will enable others skilled in the art to which it pertains to make and use it, reference being had to the accompanying drawings, which form part of this specification, in which—

Figure 1:
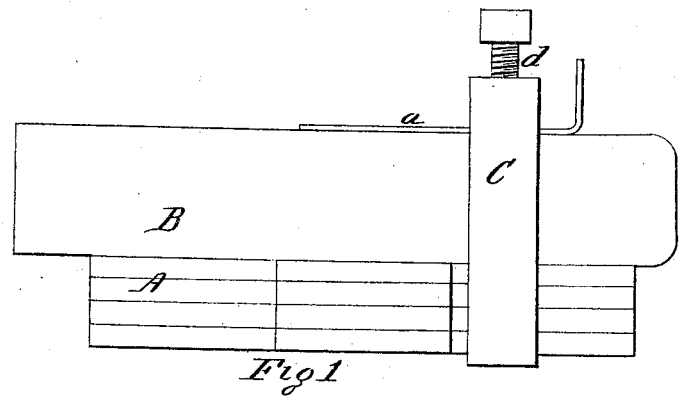
Figure 2:
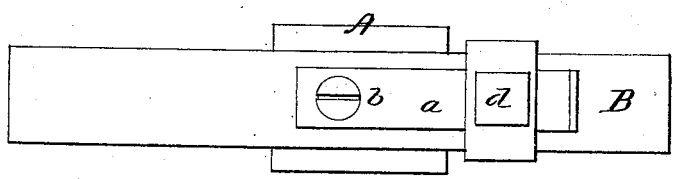

Figure 1 is a side view, and Fig. 2 a face view, of my invention.

The object of this invention is to provide means for attaching a loom-picker to a shaft in an easier and more secure manner than has heretofore been done.

Referring to the accompanying drawing, A shows the picker, made of leather and in any desired form. B is the shaft. C is a metal band cast or wrought in a solid piece and having in one of its ends a threaded hole for the admission of a screw, $d$. Between the shaft and end of the band C is placed a strip of metal, $a$, bent up at one end and secured to the shaft by means of a common wood-screw, $b$, passing through a hole in said strip. The purpose of this strip is to prevent the screw $d$ from entering the shaft and injuring the same. It also prevents the band C from slipping off over the end of the shaft.

The advantages of this arrangement are that the band can be moved to and from the end of the shaft without moving the strip, and consequently but one hole need be bored in the shaft, thus preserving the strength and durability of said shaft, while, at the same time, the picker is held firmly in its place, but rendered capable of adjustment upon loosening the screw $d$.

Having fully described my invention, what I claim is—

The combination, with the picker-stick B and picker A, of the adjustable metallic collar C, having the screw $d$ in one end, and the L-shaped metallic strip $a$, said strip being permanently secured to the stick, and the collar C applied to the picker, substantially as shown and described.

In testimony that I claim the foregoing I have hereunto set my hand this 19th day of September, 1873.

ORREN A. SAWYER.

Witnesses:
CHARLES G. BLAKE,
ALBION SWEATT.